May 31, 1955 W. F. STEAGALL 2,709,798

BISTABLE DEVICES UTILIZING MAGNETIC AMPLIFIERS

Filed April 22, 1954 2 Sheets-Sheet 1

INVENTOR
WILLIAM F. STEAGALL

BY [signature]

ATTORNEY

BISTABLE DEVICES UTILIZING MAGNETIC AMPLIFIERS

Filed April 22, 1954

2 Sheets-Sheet 2

INVENTOR
WILLIAM F. STEAGALL
BY
E. Jerry Light
ATTORNEY

United States Patent Office 2,709,798
Patented May 31, 1955

2,709,798

BISTABLE DEVICES UTILIZING MAGNETIC AMPLIFIERS

William F. Steagall, Merchantville, N. J., assignor to Remington Rand Inc., Philadelphia, Pa., a corporation of Delaware Application April 22, 1954, Serial No. 424,880
15 Claims. (Cl. 340—167)

The present invention relates to bistable devices and is more particularly concerned with such devices in the nature of binary counters or flip-flop devices utilizing magnetic amplifiers.

As is well known, one of the basic components used in computing techniques for instance, is the bistable device. Such devices may be used as counters, whereby successive inputs on a single input line will cause the device to regularly change from one stable state of operation to another; and as flip-flop devices, wherein input signals successively applied alternately to two input lines will cause the device to again change from one stable state of operation to another.

In the past, such bistable devices have normally been constructed in the form of vacuum tube circuitry, and while such circuitry is usually acceptable, it does have several disadvantages. First, the use of vacuum tubes results in a circuit unit which is relatively large in size, thereby making disposition of components within an overall installation rather difficult. Second, vacuum tubes are subject to breakage and, as a result, circuits utilizing such vacuum tubes are often relatively fragile. Again, in the normal course of operation, vacuum tubes are subject to normal operating failures, thus raising serious questions of maintenance and the cost attendant thereto.

In order to reduce failures due to the foregoing difficulties, other forms of electrical devices have been suggested for use in bistable circuits. One such other form is the magnetic amplifier and it is with this particular type of bistable device that the present invention is primarily concerned.

It is accordingly a prime object of the present invention to provide a novel bistable device utilizing magnetic amplifiers as the basic components thereof.

A further object of the present invention resides in the provision of a bistable device which is both inexpensive to construct and which exhibits considerable ruggedness.

A further object of the present invention is the provision of a bistable device which can be made in relatively small sizes.

Still another object of the present invention resides in the provision of a bistable device in the nature of a binary counter utilizing magnetic amplifiers.

A still further object of the present invention resides in the provision of a bistable device in the nature of a flip-flop utilizing magnetic amplifiers.

Still another object of the present invention is the provision of a bistable device in the nature of a counter utilizing plural complementing magnetic amplifiers and an interconneecting network for selectively causing the device to switch from one of its stable states to the other.

A still further object of the present invention resides in the provision of binary counter circuits which may respond to input pulses of either a given predetermined phase or which may respond to an input of either of two predetermined phases.

The foregoing objects are achieved in the present invention by the provision of a bistable device which comprises basically two complementing magnetic amplifiers. In this respect it should be noted that a complementing amplifier is, by definition, one which will give an output when no input is presented thereto or on the contrary, one which gives no output when there is in fact an input. In accordance with the foregoing concept, the bistable devices of my invention utilize two such complementing amplifiers interconnected "head to tail" whereby the output of one of the said amplifiers is fed back as an input to the other, maintaining the other of said amplifiers in a non-output producing state. Clearly if an input pulse should be applied to the amplifier in an operating condition, this input will cause the said operating amplifier to be cut off thus discontinuing the feedback to the other of said magnetic amplifiers and causing it to commence producing output signals in turn. In achieving the foregoing selective feedback, I further provide a supplemental network utilizing at least a gate and a delay device, and in this respect the said delay effect may preferably be achieved by the use of a non-complementing amplifier as will be described.

In one form of my invention the circuit is so arranged that it acts as a counter, namely, it has but a single input line for the reception of step input signals. The present invention in one embodiment thereof provides a circuit which is responsive to step input signals of a given predetermined phase only, whereby successive input pulses of the said predetermined phase on the said single input line, will cause the device to regularly switch from one of its stable states to the other thereof.

In another embodiment of my invention this basic circuit is modified somewhat so that either phase of two input signal phases may be accepted, the circuit being so arranged that when one phase input is in fact received, the output will always be of a first state regardless of its prior operation, while if the second input phase is received the circuit will always have an output of the second stable state, again regardless of the prior operation of the device.

In still another embodiment of my invention, the circuit is so arranged that either phase of two input signal phases may be received and reception of either of the said input signals will cause the device to switch from one of its stable states to the other regardless of its prior operation.

In still another embodiment of the present invention, the foregoing considerations are utilized to effect a simple flip-flop circuit which is responsive to either phase of two input signal phases on its set line and is similarly responsive to either phase of two input signal phases on its reset line.

Before proceeding with the description of my invention, several definitions of the subject matter to be discussed are advisable. The basic term "complementing amplifier" has already been discussed. It has also been mentioned that the invention to be described may use a non-complementing amplifier for delay purposes. Such an amplifier is by definition one which will not produce an output signal unless an input signal is presented thereto. The above complementing and non-complementing amplifiers have been discussed more fully in copending application of Theodore H. Bonn and Robert D. Torrey, Serial No. 402,858, filed January 8, 1954, for "Signal Translating Device"; in the copending application of John Presper Eckert, Jr. and Theodore H. Bonn, Serial No. 382,180, filed September 24, 1953, for "Signal Translating Device"; and in the copending application of H. W. Kaufmann, Serial No. 429,059, filed April 19, 1954, for "Magnetic Bistable Device." Each of the foregoing applications has been assigned to the assignee of the instant application, and it is to be understood that the present invention may utilize the forms of amplifiers disclosed in the said prior copending applications as well as the particular forms to be described. Other variations will readily suggest themselves to those skilled in the art.

Several other definitions will be of value in the understanding of the present invention. As will be described, the several amplifiers employed in the bistable devices of my invention are energized by "power pulses." These pulses are preferably in the form of regularly occurring positive and negative going square waves. In the disposition of components, some amplifiers will be fed by "phase 1 power pulses" and this term merely refers to such positive and negative going square wave pulses as timed with respect to an arbitrary datum. Other of the amplifiers will utilize "phase 2 power pulses" and it is to be understood that this latter term again refers to pulses of the same form as the phase 1 pulses with the sole exception that a positive-going portion of a phase 1 pulse coincides with a negative-going phase 2 pulse and vice versa. Again, it will become apparent from the following description that the several power pulses cooperate with input pulses to selectively produce or inhibit an output from the amplifier. These input pulses must occur during a negative-going portion of the power pulse with which it is to cooperate; and in this respect, therefore, when I speak of a "phase 1 input pulse" it is to be understood that this term refers to an input pulse occurring during a negative-going portion of a phase 1 power pulse, or in brief, an input pulse which may effectively cooperate with a phase 1 power pulse. Similarly, a "phase 2 input pulse" is one which occurs during a negative-going portion of a phase 2 power pulse, as will become apparent from the following description. A phase 1 input pulse cannot cooperate with a phase 2 power pulse, nor can a phase 2 input pulse cooperate with a phase 1 power pulse.

The foregoing objects, advantages and operation will become more readily apparent from the following description and accompanying drawings, in which.

Figure 1:
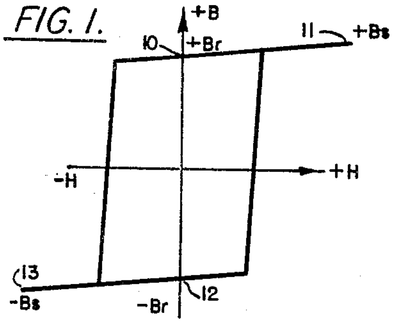
Figure 1 is an idealized hysteresis loop of a magnetic material which may preferably be employed in the cores of the magnetic amplifiers utilized in my invention.

Referring now to Figure 1, it will be seen that the magnetic amplifiers of my invention preferably utilize magnetic cores exhibiting a substantially rectangular hysteresis loop. Such cores may be made of a variety of materials, among which are various types of ferrites and various kinds of magnetic tapes, including Orthonik and 4-79 Moly-Permalloy. These materials may have different heat treatments to give them different desired properties. In addition to the wide variety of materials applicable, the cores of the magnetic amplifiers to be discussed may be constructed in a number of different geometries including both closed and open paths. For example, cup-shaped cores, strips of material, or toroidal cores are possible. It must be emphasized that the present invention is not limited to any specific geometries of its cores or to any specific materials therefor, and the examples to be given are illustrative only. In the following description bar type cores have been utilized for ease of representation and for facility in showing winding directions. Further, although the following description refers to the use of materials having hysteresis loops substantially as shown in Figure 1, this again is done merely for ease of discussion; and other forms of hysteresis loops may in fact be utilized. Thus, neither the precise core configuration nor core material to be discussed is mandatory and many variations will readily suggest themselves to those skilled in the art.

Returning now the the hysteresis loop shown in Figure 1, it will be noted that the curve exhibits several significant points of operation, namely, point 10 (plus B*r*) which represents a point of plus remanence; the point 11 (plus B*s*), which represents plus saturation; the point 12 (−B*r*), which represents minus remanence; and the point 13, which represents minus saturation (−B*s*).

Figure 4:
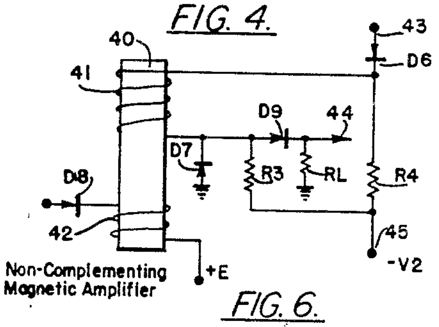
Figure 4 is a schematic representation of a basic non-complementing amplifier of the magnetic type.
Figure 5:
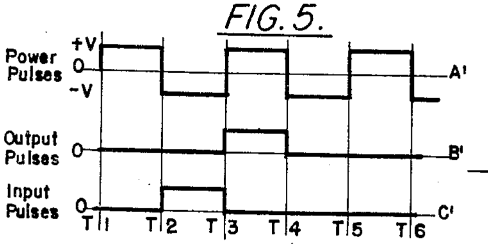
Figure 5 (A', B' and C') are wave forms illustrating the operation of the non-complementing amplifier shown in Figure 4.

Discussing for the moment the operation of a device utilizing a core which exhibits a hysteresis loop such as is shown in Figure 1, let us assume that a coil is mounted or wound on said core. If we should initially assume that the core is at an operating point 10 (plus remanence), and if a current should be passed through the coil on the said core in a direction such as to produce a magnetizing force in a direction of plus H, that is in a direction tending to increase the flux in the said core in the same direction, the core will tend to be driven from point 10 (plus B*r*) to point 11 (plus B*s*). During this state of operation, there is relatively little flux change in the said core and the coil therefore presents a relatively low impedance whereby energy fed to the said coil during this state of operation will pass readily therethrough and may be utilized to effect a usable output. On the other hand, if the core should somehow be "flipped" from point 10 (plus B*r*) to point 12 (−B*r*), prior to the application of a plus H pulse, upon application of such a pulse the core will tend to be driven from the said point 12 (−B*r*) to the region of point 11 (plus saturation). During this particular state of operation, there is a very large flux change in the said core and the coil therefore presents a relatively high impedance to the applied pulse. As a result, substantially all of the energy applied to the coil, when the core is initially at −B*r*, will be expended in flipping the core from point 12 to the region of plus saturation, point 11, with very little of this energy actually passing through the said core to give a usable output providing the size of the said plus H pulse is properly chosen. Thus, depending upon whether the core is initially at point 10 (plus B*r*) or at point 12 (−B*r*), an applied pulse in the plus H direction will be presented respectively with either a low impedance or a high impedance and will effect either a relatively large output or a relatively small output. These considerations are of great value in the construction of the basic magnetic amplifier such as are shown in Figures 2 and 4.

Figure 2:
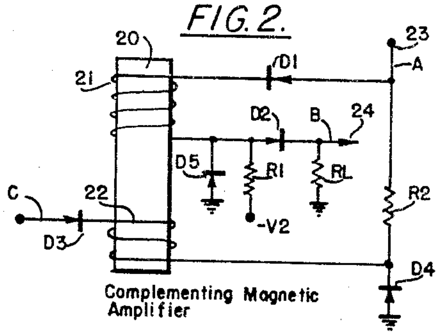
Figure 2 is a schematic representation of a basic complementing amplifier of the magnetic type.
Figure 3:
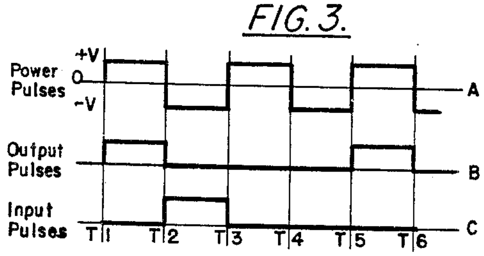
Figure 3 (A, B and C) are wave forms illustrating the operation of the complementing amplifier shown in Figure 2.

Referring now to the circuit shown in Figure 2, and making reference to the wave form diagrams of Figure 3 (A through C), it will be seen that a complementing magnetic amplifier provided in accordance with the present invention, comprises a core 20 exhibiting a hysteresis loop preferably similar to that discussed in reference to Figure 1. The core 20 bears two windings thereon, namely, winding 21 which is termed the power or output winding and winding 22 which is termed the signal or input winding. One end of the power winding 21 is coupled to a diode D1, poled as shown; the anode of diode D1 is connected to an input terminal 23 to which terminal is fed a train of positive and negative-going power pulses such as is shown in Figure 3A. (The schematic of Figure 2 includes letters A, B and C thereon and these letters refer to points of the circuit wherein the corresponding wave forms shown in Figure 3A through C inclusive will appear.) For purposes of the following discussion, the power pulses are shown to have a center value of zero volts and to exhibit excursions between plus and minus V volts. Assuming now that the core is initially at the plus remanence point (point 10 of Figure 1), a positive-going power pulse applied at terminal 23 during the time $t1$ to $t2$ will pass through the diode D1, through the relatively low impedance exhibited by power winding 21 and thence through diode D2 to an output point 24. As a result, an output pulse will appear at the terminal 24 during the time $t1$ to $t2$. At the end of the said positive-going power pulse at time $t2$, and in the absence of other signal inputs, the core will return to the operating point 10 and will remain at the said plus remanence point until a further positive-going power pulse, applied for instance during the time $t3$ to $t4$ will again tend to drive the core to plus saturation. Thus, in the absence of any other inputs, if the core 20 should initially be at plus remanence, successive positive-going power pulses will cause successive outputs to appear at output terminal 24, in coincidence with the application of the said positive-going power pulses. Let us now assume, however, that an input pulse is applied during the time $t2$ to $t3$, such as shown in Figure 3C. This input pulse passes through the diode D3 and through coil 22; and, as will be noted from Figure 2, inasmuch as the said coil 22 is wound in a direction opposite to that of coil 21 the said input pulse will effect a magnetizing force in a minus H direction on the core 20. Thus, during the time $t2$ to $t3$, the application of an input pulse as described will tend to cause the core to be flipped in a counterclockwise direction from the point 10 (plus remanence ) to the region of point 13 shown in Figure 1, and preferably to just the beginning of the minus saturation region. And at the end of the said input pulse at time $t3$ the core will find itself substantially at the operating point 12 (minus remanence) preparatory to the reception of the next positive-going power pulse during the time $t3$ to $t4$. This next positive-going power pulse appearing at terminal 23 during the said time $t3$ to $t4$, will therefore find the coil 21 to present a relatively high impedance, and as a result most of the energy presented by the said power pulse will be expended in flipping the core back to the region of point 11 (plus B*s*) rather than in producing a usable output. Thus, as will be seen from an examination of Figure 3, the application of an input pulse during the occurrence of a negative-going portion of the applied power pulse will effectively prevent the output of a usable pulse during the next succeeding positive-going power pulse. The system thus acts as a complementer.

Continuing now with the showing of Figure 3, if no input pulse is again applied during the time $t4$ to $t5$, an output pulse will once more appear during the time $t5$ to $t6$. Since the power pulse appearing between time $t3$ and $t4$ caused the core to once more assume its plus remanence operating point, the next positive-going input pulse will find the core still to be at this operating point and will again drive the core to plus saturation, giving the desired ouput.

While the foregoing discussion has described in essence the operation of a complementing magnetic amplifier in accordance with the present invention, several considerations should be noted for proper design of such an amplifier. First of all, the passage of current through coil 21, due to the application of a positive-going power pulse at the terminal 23, will cause only a small flux change to occur in the core 20 as described if the core is initially at point 10 (plus B*r*), and this flux change will in turn tend to induce a voltage in the signal coil 22. This induced voltage is negative at the cathode of D3 and positive at the cathode of D4, and although the induced voltage is small it is nevertheless necessary to prevent current from flowing in the lower winding 22 due to this small induced voltage. The combination of resistor R2 and diode D4 accomplishes this function by allowing the lower end of signal winding 22 connected to the junction of the said resistor R2 and diode D4 to attain the potential of the power pulse when the power pulse is positive. Since the base level of an input pulse, as applied through diode D3, is zero volts no current can flow due to the small induced voltage discussed previously.

Again, if the core 20 is initially at —B*r*, point 12, upon application of a positive-going power pulse a relatively large flux change occurs in the core and a relatively large voltage of the previously discussed polarity is induced in the lower winding 22. The blocking action of the R2—D4 circuit still prevents current from flowing in the said lower winding 22 due to the said induced potential if there are fewer turns on winding 22 than are on power winding 21. According to principles well known in the art, this relationship between the number of turns on the winding must exist if a voltage gain is to be produced by the amplifier.

Again, it should be noted that when the power pulse shown in Figure 3A is negative-going, only a negligible current can flow in diode D1. In this respect it has been assumed that the back resistance of the several diodes shown is infinite and that the forward resistance is zero. While this is not strictly true, these assumptions are convenient and do not substantially effect the explanation. Even though no current flows through the diode D1 during application of a negative-going portion of the power pulse, current still flows in the R2—D4 circuit, the magnitude of this current being approximately $$\frac{V}{R2}$$

This current serves to hold the end of signal winding 22 connected to the junction of resistor R2 and diode D4 at approximately ground potential and as a result signal inputs applied through diode D3 during a negative-going power pulse portion pass through the said diode D3 through winding 22, as previously discussed, to the junction of resistor R2 and diode D4 which is approximately at ground potential. It must further be noted that the current which flows in winding 22 as the result of an input pulse at the anode of diode D3, must produce sufficient magnetizing force to flip core 20 from plus remanence to minus remanence during the input pulse period. The value of current required to produce the said magnetizing force must not exceed the magnitude $$\frac{V}{R2}$$

but this condition is easily arranged by proper choice of resistor R2. Finally, even though the core 20 should initially be at its minus remanence point immediately prior to application of a positive-going power pulse (the "no-output" state), the said positive-going power pulse, in flipping the core from the minus remanence point to the plus remanence point, will still cause a small current to flow through coil 21 and a small output to appear at the terminal 24 as a result. This small output is termed a "sneak output" and should desirably be suppressed. The resistor R1 and diode D5 effect such a sneak output suppression. In this respect the resistor R1 is so chosen that current flows to a source of potential minus V2 through the said resistor R1, and through diode D5 from ground, which current has a magnitude equal to that of the sneak pulse current to be suppressed. As a result of resistor R1 and diode D5 therefore, only outputs substantially larger than the sneak output may appear at output terminal 24.

Summarizing the foregoing briefly, it will be seen that the basic circuitry of Figure 2 provides a complementing magnetic amplifier wherein outputs will appear from the said amplifier so long as no input signal is presented thereto during negative-going portions of the power pulses applied; and, on the contrary, upon application of an input pulse during such a negative-going power pulse portion no output will occur during the next succeeding positive-going portion of the power pulse.

The foregoing design considerations are also present in part in the non-complementing amplifier shown in Figure 4, and their application to the circuit of Figure 4 will be readily apparent to those skilled in the art. Only one additional consideration should be noted in respect to the disposition of components shown in the circuit of Figure 4, and that is that in order to protect the input circuit (connected to the diode D8 to be discussed) against any interference from current flowing in the output winding (41), the signal winding (42) is returned to a positive voltage plus E which is equal and opposite in value to the voltage induced or generated in it by current flowing in the power winding 41 when reverse current flows through the said winding 41, as will be discussed in the following paragraphs.

Discussing the basic operation of the device shown in the said Figure 4 therefore, it will be seen that a non-complementing amplifier in accordance with the present invention again utilizes a magnetic core 40, preferably exhibiting a hysteresis loop substantially the same as that shown in Figure 1. This core 40 again carries two windings thereon, namely, a power winding 41 and a signal input winding 42, but it should be noted that the signal input winding is reversely wound with respect to winding 22 of the device, as shown in Figure 2. Assuming now that the device is initially at the minus B*r* point seen in Figure 1, application of a positive-going power pulse during the time *t1* to *t2* at power input terminal 43 will cause a current to flow through the diode D6 to winding 41 and thence through diode D9 to load resistor RL. Inasmuch as this energy is for the most part expended in flipping the core from minus B*r* to plus B*r*, only a sneak output will be present, if at all, at output terminal 44 and this sneak output is effectively suppressed by the combination of resistor R3 and diode D7. The sneak suppressor circuit R3—D7 is directly analogous to the circuit R1—D5 discussed with reference to Figure 2. Thus, the core initially having been at the minus remanence point, no output pulse appears during the time *t1* to *t2* due to the application of a positive-going power pulse. Assuming for the moment that no input pulse was applied to the anode of diode D8 during the time *t2* to *t3*, the negative-going portion of the power pulse during this time period would cause diode D6 to be cut off. As a result, a reverse current will flow from ground through diode D7, through the said winding 41, thence through resistor R4, to terminal 45 which is connected to a source of negative voltage minus V2. Resistor R4 is so chosen that this reverse current flow is sufficient to flip the core from the plus B*r* point back to the minus B*r* point during the *t2* to *t3* time period. The application of the next positive-going power pulse during the time *t3* to *t4* will therefore once more be expended in merely flipping the core, and again, no usable output will be obtained. If now an input pulse should be applied during the time *t2* to *t3*, coincident with the application of a negative-going portion of a power pulse applied at terminal 43, this input pulse will pass current through the diode D8 and through coil 42 whereby a magnetomotive force equal to and in opposition to that produced by the said reverse current flow through coil 41 during this same period will be established. Thus, the application of an input pulse during the time *t2* to *t3* will effectively neutralize any magnetizing tendency of the reverse current flow through coil 41, so the core 40 will not be flipped to the minus remanence point during this time period. As a result, the next positive-going power pulse applied at terminal 43 during the time *t3* to *t4* will drive the core from plus remanence to plus saturation and will give a usable output at the terminal 44. If no input pulse is present during the time *t4* to *t5*, the reverse current flow through coil 41 during this time again flips the core to the minus remanence point whereby again there will be no output during the time *t5* to *t6*. As will be seen, therefore, the circuit of Figure 4 is in effect a basic non-complementing type of magnetic amplifier and no usable output will be obtained during a positive-going power pulse portion unless an input pulse was present during the negative-going power pulse portion immediately preceding it. The foregoing circuits readily lend themselves to the construction of bistable devices in accordance with the present invention.

Figure 6:
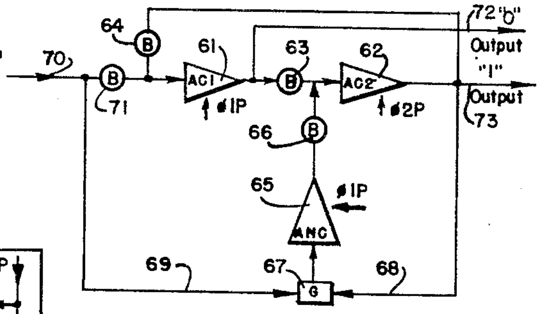
Figure 6 is a logical diagram of a three-core binary counter in accordance with the present invention.

Referring now to Figure 6, one such form of bistable device is shown which is responsive to step input pulses of phase 1 only (i. e. step input pulses occurring during a negative-going portion of a phase 1 power pulse). Figure 6 has been presented in the form of a logical diagram and the legends employed are given immediately thereunder. The bistable device of Figure 6 comprises essentially two complementing magnetic amplifiers 61 and 62 of the type previously discussed. The output of magnetic amplifier 61 is fed through a buffer 63 to the input of amplifier 62; and the output of amplifier 62 is in turn fed through a buffer 64 to the input of amplifier 61. Also coupled to the input of amplifier 62 is a non-complementing amplifier 65 having its output coupled through a buffer 66. The input to non-complementing amplifier 65 is selectively fed through a gate 67 having inputs 68 (from the output of amplifier 62) and 69 (from the step input source 70). The gate 67 is of a type well known in the art and will provide an output signal only when inputs are present at both of lines 68 and 69. Step inputs at terminal 70 are also fed through a buffer 71 to the input of amplifier 61.

Examining now the operation of the device shown in Figure 6, it will initially be seen that if magnetic complementing amplifier 61 is producing outputs, these outputs will appear at a terminal 72 and will also be fed through buffer 63 to the input of amplifier 62. Thus, so long as amplifier 61 is in fact operating, output pulses from amplifier 62 will be inhibited. On the other hand, if magnetic amplifier 62 should be operating, outputs will appear at terminal 73 and will also be fed back through buffer 64 to the input of amplifier 61, thus maintaining the said amplifier 61 in a non-output producing state. Again, so long as amplifier 62 is operating, amplifier 61 will not produce outputs. The device thus has two stable states.

Let us assume now that amplifier 61 is in fact producing an output hereinafter termed the "0" output, which output maintains amplifier 62 in a non-output producing state. Referring to Figure 8*c*, it will be seen that during this state of operation an output pulse will appear from the complementing amplifier 61 in coincidence with the positive-going portions of phase 1 power pulses applied thereto, namely, during the time *t1* to *t2*, *t3* to *t4*, etc. If a phase 1 step input pulse (Figure 8*a*) should now be applied during the time $t4$ to $t5$, this input pulse will prevent an output from magnetic amplifier 61 during the time $t5$ to $t6$. There is therefore no input to amplifier 62 during the said $t5$ to $t6$ time, and as a result, magnetic amplifier 62 will commence producing output pulses in coincidence with the positive-going portions of the phase 2 power pulse, during time $t6$ to $t7$, $t8$ to $t9$, etc. The step input pulse during time $t4$ to $t5$ is coupled through buffer 71 to the input of complementing amplifier 61 and is also fed via the terminal 69 to gate 67. However, inasmuch as no input appears on the line 68 during this particular time, no output will occur from gate 67.

If a further phase 1 step input pulse should now be applied for example during the time $t10$ to $t11$, this input pulse will be fed via buffer 71 to the input of magnetic amplifier 61, but it will have no effect on the said amplifier 61 per se, inasmuch as it is merely cumulative to pulses being fed back from the output of amplifier 62 via buffer 64. The step input pulse during time $t10$ to $t11$ will also be fed via terminal 69 to gate 67 and inasmuch as an input is also being fed to the said gate on line 68 from the output of amplifier 62 during this time, gate 67 will pass an output pulse (Figure 8*f*) during this time period to the input of non-complementing amplifier 65. An examination of the wave forms in Figure 8 will show that this output occurs during a negative-going portion of a phase 1 power pulse; and inasmuch as non-complementing amplifier 65 is energized by such phase 1 power pulses, there will be an output from the non-complementing amplifier 65 during the time $t11$ to $t12$ (Figure 8*g*), which output is fed through the buffer 66 to the input of complementing amplifier 62. It will again be noted that the output from non-complementing amplifier 65 occurs during a negative-going portion of a phase 2 power pulse and inasmuch as complementing amplifier 62 is energized by such phase 2 power pulses, the input through buffer 66 will cause complementing amplifier 62 to cut off, thereby in turn causing complementing amplifier 61 to resume operation, and the circuit will thus assume its original stable state. Further phase 1 step input pulses will cause the same cycle of operations to be repeated. Thus successive phase 1 step input pulses at the terminal 71 will cause the bistable device of Figure 6 to successively change from one of its stable states to the other and the device of Figure 6 may therefore be utilized as a binary counter.

Figure 7:
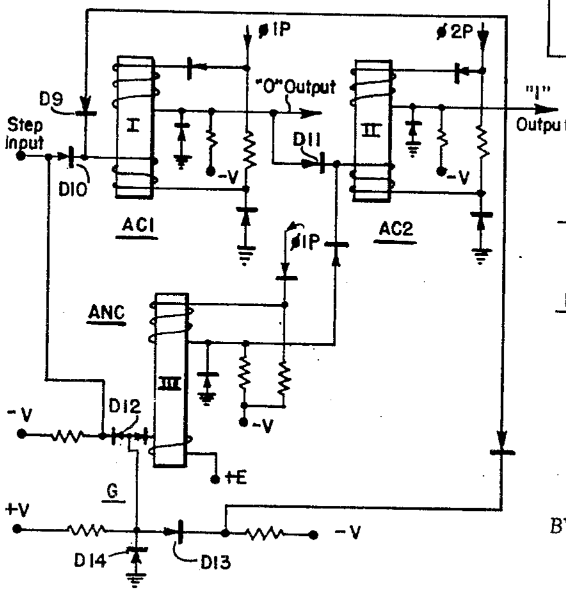
Figure 7 is a schematic diagram of the device shown in Figure 6.
Figure 7:
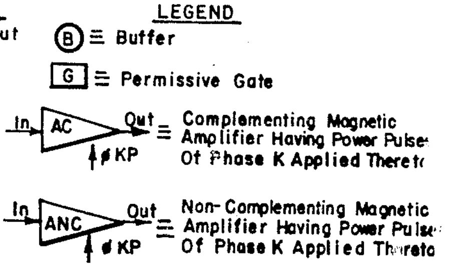

Figure 7 is a schematic diagram of the circuit discussed above in reference to Figure 6, and is presented to show how the amplifiers of Figures 2 and 4 may be interconnected to effect the counter of Figure 6. Diode D9 corresponds to buffer 64; diode D10 corresponds to buffer 71; diode D11 corresponds to buffer 63; diodes D12 and D13, clamping diode D14, and their associated resistors correspond to the gate G; the magnetic amplifier having core I corresponds to complementing amplifier 61; the magnetic amplifier having core II corresponds to complementing magnetic amplifier 62; and the magnetic amplifier having core III corresponds to non-complementing amplifier 65. The several individual amplifiers operate in the manner described with reference to Figures 2 and 4, and the overall system, of course, functions in accordance with the discussion in reference to Figures 6 and 8. In actually constructing the circuit of Figure 7, the several diodes may take the form of semiconductor diodes thereby enhancing the ruggedness of structure and the small size of the overall counter device.

Examining Figures 8*d* and 8*g*, it will be seen that two successive step inputs cause non-complementing amplifier 65 to have a single output. Further, it will be noted that this output is in coincidence with a negative-going portion of a phase 2 power pulse. These considerations readily permit plural counters of the type shown in Figure 6 to be interconnected thereby to form a counter chain for the counting of large numbers. The number of actual stages will, of course, depend on the magnitude of the numbers to be counted, as is well known to those skilled in the art.

Figures 8, 9, 10, 11:
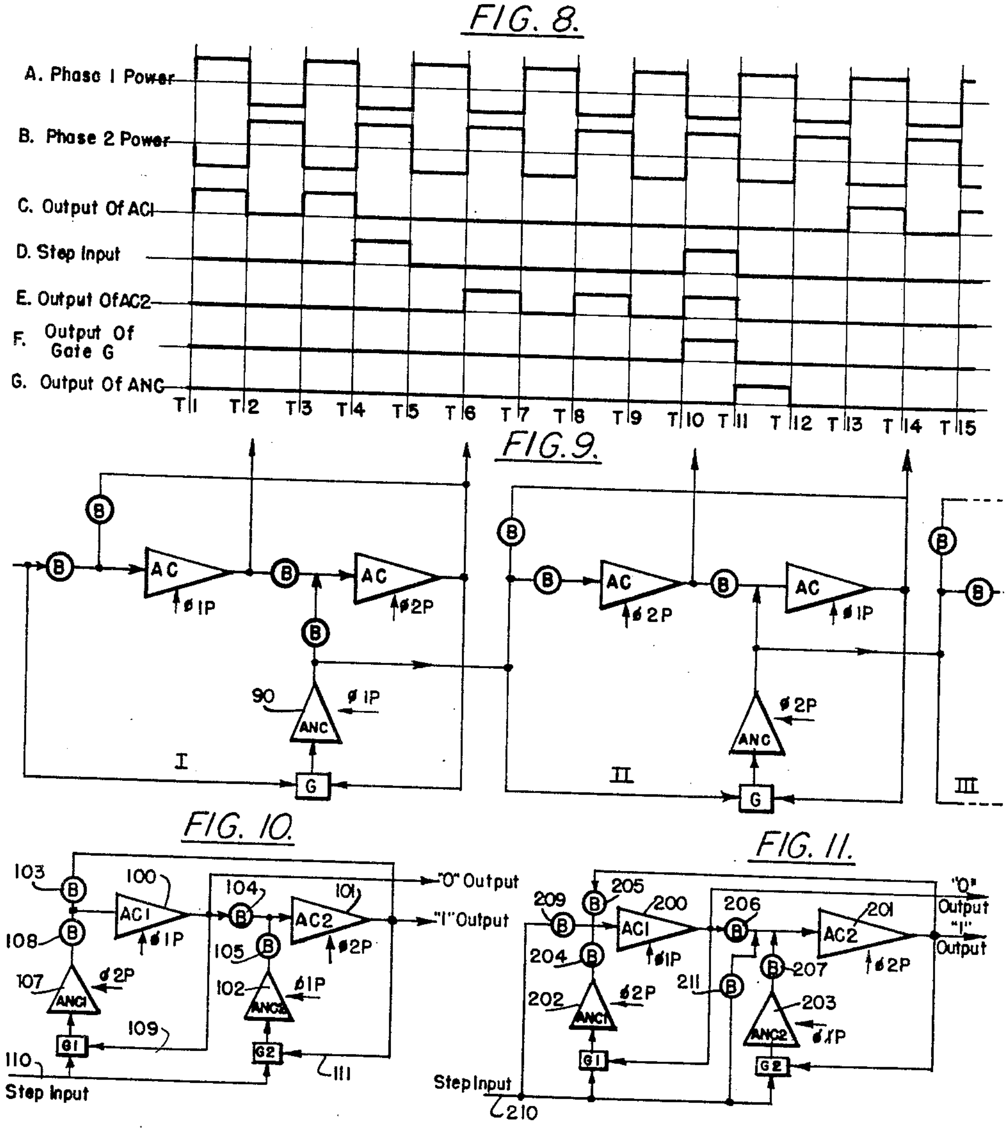
Figure 8 (*a* through *g* inclusive) are wave forms illustrating the operation of the device shown in Figures 6 and 7.
Figure 9 is a logical diagram illustrating the manner in which plural devices of the type shown in Figure 6 may be interconnected to form a counter chain for the counting of large numbers.
Figure 10 is a logical diagram of a further embodiment of my invention whereby either phase 1 or phase 2 input signals may be applied at a single step input line. In this respect it should be noted that the device of Figure 10 is a flip-flop in one sense and a binary counter in another.
Figure 11 is a logical diagram of a further embodiment of my invention depicting a binary counter which is responsive to either phase 1 or phase 2 input signals for causing the device to switch from one stable state to the other regardless of its prior operating condition.

Figure 9 illustrates the method by which counters such as are shown in Figure 6 may be interconnected to provide such a counter chain. As will become apparent from an examination of Figure 9, the output of non-complementing amplifier 90, in the counter stage I, acts as a step input to the next counter stage II. Inasmuch as the output of this non-complementing amplifier 90 is truly a phase 2 input to counter stage II (as compared with the phase 1 step inputs to counter stage I described with reference to Figure 6), the power pulses applied to the several complementing and non-complementing amplifiers of stage II must be reversed in phase. Thus, in counter stage II the left-hand complementing magnetic amplifier is fed with phase 2 power; the right-hand complementing amplifier is fed with phase 1 power; and the non-complementing amplifier is fed with phase 2 power, these power phases being the direct reverse of those utilized for the corresponding amplifier stages in counter stage I. Again, the output of the non-complementing amplifier in counter stage II will be, by analogy with the previous discussion, a phase 1 input to counter stage III, and as a result, the power pulses applied to the several magnetic amplifiers of counter stage III will be the same as those applied to counter stage I. Throughout the foregoing discussion and for that matter throughout the discussion to follow, I have stated that non-complementing amplifiers, such as 65 and 90, may be utilized in the selective coupling of control pulses to one of the complementing amplifier stages. It will be readily apparent to those skilled in the art, that for purposes of simplification of the overall circuit, these non-complementing amplifiers may be replaced by a simple delay network such as a delay line. Thus, referring to Figures 6 and 9, for instance, a delay line could be substituted for the non-complementing amplifiers 65 or 90, etc., this delay being sufficient to cause an input pulse appearing at the input to the delay line, to reappear at the output one time period later. The actual period of delay for instance is shown in Figure 8*f* and *g*, wherein the input to non-complementing amplifier 65 (or to a delay line substituted therefor) appears during the time $t10$ to $t11$, and the output from the said amplifier 65 or from the delay line appears in the next following time period, namely, $t11$ to $t12$. Again, it should be noted that the step pulses applied to the counters already described, and to the bistable devices to be described, may be applied at a frequency equal to the power frequency or at any integral submultiple thereof.

As was pointed out in the discussion of the circuit shown in Figure 6, the counter of that figure is responsive to phase 1 step input pulses only, and will not operate if by some chance phase 2 step input pulses are in fact applied at the terminal 70. An extension of this circuit is shown in Figure 10, which is a flip-flop in one sense and a binary counter in another.. As will become apparent from the following discussion, either phase 1 or phase 2 signals may be applied to the step input of Figure 10. However, phase 1 signals will always set the device to the "0" output condition while phase 2 signals will always set the device to the "1" output condition regardless, in either event, of the operating state of the counter or flip-flop immediately prior to the application of such signal. Examining Figure 10, it will be seen that I again provide two complementing amplifiers 100 and 101, a non-complementing amplifier 102, buffers 103, 104 and 105, and a gate G2. Each of these circuit components find a direct equivalent in the circuit of Figure 6. In addition, the circuit of Figure 10 provides a further non-complementing amplifier 107, the output of which is coupled to the input of complementing amplifier 100 through a buffer 108. The output of complementing amplifier 100, in addition to being fed to the input of complementing amplifier 101, is also fed by way of a line 109 to a further gate G1, as shown. The circuit of Figure 10 thus possesses bilateral symmetry as to both of the complementing amplifiers 100 and 101; the several complementing and non-complementing amplifiers are fed with power phases as shown in the said Figure 10. If we should assume now that the complementing amplifier 100 is in an output producing condition (the "0" output condition), this output from complementing amplifier 100 will keep complementing amplifier 101 in a non-output producing condition and will further feed a signal through line 109 to gate G1. If a phase 1 step input signal should now be applied at terminal 110, this input signal will be coupled to both gates G1 and G2. Gate G2 will not give any output inasmuch as there is no input on line 111 coupled thereto. Gate G1 will not produce an input to non-complementing amplifier 107 inasmuch as complementing amplifier 100, which energizes line 109, is energized by phase 1 power pulses and the step input to the said gate is a phase 1 input occurring in the intervals between outputs from complementing amplifier 100. Thus, no change will occur in the state of the circuit. In short, when the circuit is originally in a "0" output producing state, a phase 1 input will have absolutely no effect upon the operation of the circuit. If, for this same operating state, a phase 2 step input should be applied to input line 110, this phase 2 input will again be fed to gate G2 and again inasmuch as there is no input on line 111 to gate G2, no output will appear from gate G2. The phase 2 input being fed to gate G1, however, will cooperate with the signal on line 109 to cause an output from the said gate G1. This output, being of phase 2, acts as an input to non-complementing amplifier 107 which is fed with phase 2 power whereby a further output from non-complementing amplifier 107 is fed through buffer 108 to the input of complementing amplifier 100 causing the said complementing amplifier 100 to be cut off, whereby complementing amplifier 101 commences producing outputs. Thus, the phase 2 input has caused the circuit to assume the "1" output condition. A similar analysis will demonstrate that further phase 2 input signals will have no effect in causing the circuit to resume its "0" output condition. However, if a phase 1 input should now be applied to line 110, this will cause an input via gate G2 to non-complementing amplifier 102 and inasmuch as this non-complementing amplifier 102 is energized by phase 1 power pulses, an output will be passed through buffer 105 to the input of complementing amplifier 101 causing the circuit to revert to its "0" output stable state. Thus, regardless of any prior condition of operation of the overall circuit, a phase 1 step input pulse will cause the circuit to either maintain or revert to a "0" output producing condition, while a phase 2 step input pulse will cause the circuit to maintain or revert to a "1" output condition. It should be noted that the maximum frequency of step pulses in the circuit of Figure 10 is two-thirds that of the power pulse frequency. In a modified form of the circuit, the step input 110 may be connected directly to buffers 108 and 105 in which case step inputs may be allowed to occur at up to twice the frequency of the power pulse frequency.

A still further modification of the present invention is illustrated in Figure 11, and the device shown therein comprises a binary counter which is responsive to both phase 1 and phase 2 input pulses, and which will change from one of its stable states to the other thereof upon the application of input pulses of either phase. The circuit shown in Figure 11 again comprises two complementing amplifiers 200 and 201; two non-complementing amplifiers 202 and 203; gates G1 and G2; and buffers 204, 205, 206 and 207. Each of the foregoing components finds an equivalent component in the circuit of Figure 10. In addition, I provide a further buffer 209 coupling the step input line 210 to the input of complementing amplifier 200 and a still further buffer 211 coupling the step input line 210 to the input of complementing amplifier 201. The provision of these further buffers and coupling lines permits the circuit to be responsive to input pulses of either phase 1 or phase 2. Let us assume that complementing amplifier 200 is in an output producing condition (the "0" output state). As was discussed in reference to the circuit of Figure 10, a phase 1 input pulse would normally have no effect upon the operation of the circuit under these circumstances. However, due to the modification shown in Figure 11, if a phase 1 step input pulse should now be applied to the circuit, this input will be fed via buffer 211 to the input of amplifier 201 and via the buffer 209 to the input of amplifier 200. The signal pulse fed via buffer 211 will have no effect upon complementing amplifier 201, inasmuch as that amplifier is energized by phase 2 power. However, a phase 1 step input fed via buffer 209 to the input of complementing amplifier 200 will cause the said amplifier 200 to be cut off whereby complementing amplifier 201 will commence producing outputs and the overall counter will assume its "1" output stable state. If a further phase 1 input should now be applied, this will cause reversion to the "0" output state, in accordance with the theory discussed with reference to Figure 10, namely, gate G2 will produce an output which is fed to non-complementing amplifier 203 which will, in turn, produce a further output coupled to the input of complementing amplifier 201 via buffer 207, causing the device to resume its other stable state. Thus, successive phase 1 inputs on line 210 will now cause the device to change successively from one stable state to the other. Successive phase 2 inputs at step input line 210 will have precisely the same effect due to the symmetry of the device. Thus, if the complementing amplifier 200 is in an output producing condition, the phase 2 step input at terminal 210 will be fed via gate G1 to non-complementing amplifier 202 which will, in turn, cause an input to complementing amplifier 200 via buffer 204, thereby changing the counter to its "1" output producing state. A further phase 2 step input will be coupled via buffer 211 to the input of complementing amplifier 210 cutting off the said amplifier 201 and thereby causing the counter to assume its "0" output state. Thus, successive inputs of either phase 1 or phase 2 pulses, or successive inputs of mixed phase 1 and phase 2 pulses, will cause the device to switch from one of its stable states to the other for each input pulse regardless of the phase of the input pulse.

Figure 12:
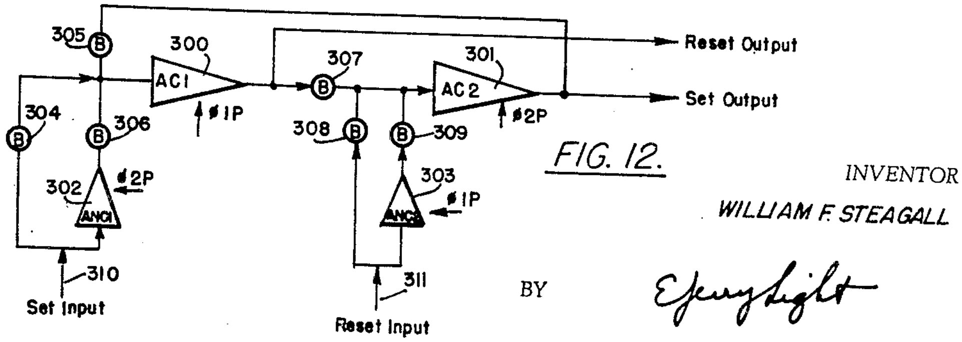
Figure 12 is a logical diagram of a still further embodiment of my invention connected as a flip-flop.

The preceding discussion has confined itself for the most part to binary counter devices. As will be shown in respect to Figure 12, however, the principles discussed above may be readily utilized in the provision of a flip-flop device. Such a flip-flop device again utilizes complementing amplifiers 300 and 301; non-complementing amplifiers 302 and 303; and buffers 304, 305, 306, 307, 308 and 309. The circuit of Figure 12 is in fact closely analogous to the counter circuit of Figure 11, except that the gates are omitted and separate set and reset input pulses are applied selectively to the inputs of each of the complementing amplifiers 300 and 301 via a buffer, or a non-complementing amplifier and buffer, coupled to the input of each of said complementing amplifiers. If we should assume that complementing amplifier 300 is in an output producing state (the "reset output" condition), a set input pulse at terminal 310 will cause the device to assume its set output condition whether the said set input pulse is of phase 1 or phase 2. If the said set input pulse should, in fact, be of phase 1, it will have no effect on the operation of non-complementing amplifier 302 but will be fed directly through buffer 304 to the input of amplifier 300 causing the said complementing amplifier 300 to be cut off, whereby complementing amplifier 301 commences producing output pulses. On the other hand, if the set input pulse at terminal 310 should be of phase 2, it will have no effect on complementing amplifier 300 as applied via buffer 304 but will cause non-complementing amplifier 302 to produce an output which is coupled via buffer 306 as a phase 1 input to complementing amplifier 300. Similar discussion applies to the possibility of applying reset inputs to terminal 311 and again, if the overall circuit should be in its set output state, namely, complementing amplifier 301 is producing outputs, reset inputs of either phase 1 or phase 2 applied to terminal 311 will cause the device to revert to a reset output producing condition. Again, it must be emphasized that in each of the foregoing circuits, the non-complementing amplifiers may be replaced directly by any desired delay means; and the step inputs to the several counters, or the set and reset inputs to the flip-flop of Figure 12, may be applied at a frequency equal to that of the power frequency or at any integral submultiple thereof.

While I have attempted to describe several particular embodiments of my invention, many variations will readily suggest themselves to those skilled in the art. In particular, the precise complementing and non-complementing magnetic amplifiers may take a number of different forms and these are all within the scope of the present invention.

Having thus described my invention, I claim:

1. A bistable device comprising first and second magnetic amplifiers, means connecting the output of each of said amplifiers to the input of the other of said amplifiers, a third magnetic amplifier having its output connected to the input of one of said first and second amplifiers, and means for selectively coupling control signals to the input of said third magnetic amplifier.

2. A bistable device comprising first and second magnetic amplifiers, means connecting the output of each of said amplifiers to the input of the other of said amplifiers, delay means coupled to the input of the second of said magnetic amplifiers, and means for selectively coupling control signals to the input of said first magnetic amplifier, and to the input of said second magnetic amplifier via said delay means.

3. A bistable device comprising first and second complementing magnetic amplifiers, means connecting the output of each of said amplifiers to the input of the other of said amplifiers, delay means having an output connected to the input of at least one of said amplifiers, gating means connected to the input of said delay means, and means for selectively coupling control signals via said gating means and said delay means to the input of at least one of said amplifiers.

4. The device of claim 3 in which said delay means has an output connected to the input of said second magnetic amplifier, the output of said second magnetic amplifier also being coupled to said gating means whereby said control signals selectively pass via said gating means to the input of said second amplifier in response to the state of operation of said second magnetic amplifier.

5. The device of claim 4 in which said delay means comprises a non-complementing magnetic amplifier.

6. The device of claim 5 in which said first complementing magnetic amplifier and said non-complementing amplifier are each energized by power pulses of a first phase, said second complementing magnetic amplifier being energized by power pulses of a second phase differing from said first phase, said control signals being phased to control amplifiers energized by power pulses of said first phase only.

7. A bistable device comprising first and second magnetic amplifiers, each of said amplifiers producing an output only when no signal is present at the input thereof, means coupling the output of each of said amplifiers to the input of the other of said amplifiers, a source of control signals coupled to the input of one of said amplifiers, delay means coupled to the input of the other of said amplifiers, and means for selectively coupling control signals from said source via said delay means to the input of said other of said amplifiers in response to the state of operation of said other of said amplifiers.

8. A bistable device comprising first and second complementing magnetic amplifiers, means coupling the output of each of said amplifiers to the input of the other of said amplifiers, delay means having an output coupled to the input of the second of said magnetic amplifiers, a source of control signals, gating means coupled to both said source of control signals and to the output of said second magnetic amplifier, the output of said gating means being coupled to the input of said delay means, and coupling means also coupling said source of control signals to the input of said first magnetic amplifier.

9. The bistable device of claim 8 in which said coupling means comprises a further delay means having an output connected to the input of said first amplifier, and further gating means coupled to said source of control signals and to the output of said first magnetic amplifier, the output of said further gating means being coupled to an input of said further delay means.

10. The bistable device of claim 9 including buffer means interposed between said source of control signals and the inputs of each of said magnetic amplifiers, the buffer means coupled to each of said amplifier inputs being in parallel with the gating and delay means coupled to said amplifier input.

11. The device of claim 10 in which each of said delay means comprises a non-complementing magnetic amplifier, each of said non-complementing amplifiers being energized by power pulses respectively of different phases, and each of said complementing amplifiers also being energized by power pulses respectively of different phases.

12. A bistable device comprising a pair of complementing magnetic amplifiers energized respectively by power pulses of different phases, means coupling the output of each of said amplifiers to the input of the other of said amplifiers, a pair of delay means having their outputs respectively connected to the inputs of said magnetic amplifiers, and means for selectively applying control pulses to the inputs of said delay means.

13. The bistable device of claim 12 in which each of said delay means comprises a non-complementing magnetic amplifier energized by power pulses of a phase different from those applied to its corresponding complementing magnetic amplifier.

14. The bistable device of claim 13 in which said means selectively applying control pulses comprises a source of control pulses and means connecting said source to each of said delay means in parallel, whereby said bistable device functions as a binary counter.

15. The bistable device of claim 13 in which said means selectively applying control pulses comprises plural pulse sources independently connected to said delay means, whereby said bistable device functions as a flip-flop.

References Cited in the file of this patent

UNITED STATES PATENTS

| | | |
|---|---|---|
| 2,021,099 | FitzGerald | Nov. 12, 1935 |
| 2,519,513 | Thompson | Aug. 22, 1950 |
| 2,591,406 | Carter et al. | Apr. 1, 1952 |
| 2,678,965 | Zitter et al. | May 18, 1954 |